(12) United States Patent
Kaplish (10) Patent No.: US 7,683,596 B1
(45) Date of Patent: *Mar. 23, 2010

(54) METHOD FOR REGULATING AN OUTPUT VOLTAGE OF A DC/DC CONVERTER USING AN ACTIVE DC OUTPUT CONTROL CIRCUIT

(75) Inventor: Anurag Kaplish, Sunnyvale, CA (US)

(73) Assignee: Summit Microelectronics, Inc., Sunnyvale, CA (US)

( * ) Notice: Subject to any disclaimer, the term of this patent is extended or adjusted under 35 U.S.C. 154(b) by 627 days.

This patent is subject to a terminal disclaimer.

(21) Appl. No.: 11/165,883

(22) Filed: Jun. 24, 2005

(51) Int. Cl.
  *G05F 1/00* (2006.01)
  *H02G 3/12* (2006.01)
  *H02M 5/257* (2006.01)
(52) U.S. Cl. ............... 323/283; 323/242; 323/284; 323/288; 323/326
(58) Field of Classification Search ......... 323/283, 323/284, 285, 286, 242, 288, 326; 341/121
See application file for complete search history.

(56) References Cited

U.S. PATENT DOCUMENTS

| 5,101,335 | A | * | 3/1992 | Ludden et al. | 363/21.17 |
| 5,724,237 | A | * | 3/1998 | Hunter | 363/65 |
| 6,005,373 | A | * | 12/1999 | Snodgrass et al. | 323/266 |
| 6,081,436 | A | * | 6/2000 | Lin | 363/65 |
| 6,110,213 | A | * | 8/2000 | Vinciarelli et al. | 703/1 |
| 6,141,762 | A | * | 10/2000 | Nicol et al. | 713/300 |
| 6,353,310 | B1 | * | 3/2002 | Wang | 323/285 |
| 6,373,419 | B1 | * | 4/2002 | Nakao | 341/154 |
| 6,380,810 | B1 | * | 4/2002 | Sutton | 331/17 |
| 6,512,472 | B1 | * | 1/2003 | Smith et al. | 341/155 |
| 6,525,516 | B2 | * | 2/2003 | Schultz et al. | 323/282 |
| 6,600,298 | B2 | * | 7/2003 | McDonald et al. | 323/271 |
| 6,661,211 | B1 | * | 12/2003 | Currelly et al. | 323/268 |
| 6,717,434 | B2 | * | 4/2004 | Takahashi et al. | 326/37 |
| 6,738,268 | B1 | * | 5/2004 | Sullivan et al. | 363/49 |
| 6,774,612 | B1 | * | 8/2004 | Ballenger et al. | 323/303 |
| 6,794,922 | B2 | * | 9/2004 | Mashimo | 327/336 |
| 6,978,007 | B1 | * | 12/2005 | Hofer et al. | 379/347 |
| 7,002,266 | B1 | * | 2/2006 | Adkins et al. | 307/151 |
| 7,148,757 | B2 | * | 12/2006 | Chiu | 331/16 |
| 7,327,129 | B2 | * | 2/2008 | Chen et al. | 323/285 |
| 7,467,339 | B2 | * | 12/2008 | Tanaka et al. | 714/724 |

\* cited by examiner

*Primary Examiner*—Jessica Han
*Assistant Examiner*—Emily Pham
(74) *Attorney, Agent, or Firm*—Fountainhead Law Group PC (57) ABSTRACT

A control loop system is provided that employs an active DC output control circuit that more accurately calibrates the desired voltage at a load, e.g. 3.3 volts, by adjusting a trim pin on a DC/DC converter.

20 Claims, 6 Drawing Sheets

METHOD FOR REGULATING AN OUTPUT VOLTAGE OF A DC/DC CONVERTER USING AN ACTIVE DC OUTPUT CONTROL CIRCUIT

BACKGROUND INFORMATION

1. Field of the Invention

The invention relates generally to integrated circuits, and more particularly to controlling a voltage in a DC/DC converter.

2. Description of Related Art

Conventional DC/DC converters have a pin available that allows the adjustment of the supply output. When this pin is left unconnected, the voltage output will be at the nominal setting for the converter within a certain tolerance set by the manufacturer. During testing of a system using these converters, it is common to run tests at this nominal voltage and at a lower and a higher voltage to ensure that the components being powered by the converter are not marginal. This is generally accomplished by placing a resistor between the supply output and the trimming pin or the trimming pin and ground. The value of the resistor will determine the voltage difference between nominal and the test voltage.

At the conclusion of a test, the trimming pin is left unconnected. The problems with this approach are: the nominal voltage output may not be as accurate as the system requires, changing the voltage difference for testing requires a resistor change, the accuracy of the output voltage is unknown due to the difficulty in obtaining exact resistor values and the unknown nominal output value of the converters, and switches are required to connect and disconnect the resistors. The resistors and switches are duplicated for each DC/DC converter in a system.

Accordingly, it is desirable to have a system and method for precisely controlling the voltage at the output of a DC/DC converter.

SUMMARY OF THE INVENTION

The present invention provides a control loop system that employs an active DC output control circuit which accurately calibrates the desired voltage at the output of a DC/DC converter or an input into a load, e.g. 3.3 volts, by adjusting a trim pin feeding into the DC/DC converter. This control loop system can also vary the DC/DC converter output voltage by adjusting the trim pin to a typical +/−20% range for margin test purposes. The trim pin of the DC/DC converter is typically connected to the output voltage via an adjusting resistor in prior art applications. In one embodiment of the present invention the DC output control circuit is based on a microprocessor that senses the DC/DC converter output voltage via an analog to digital converter and adjusts the trim pin via a digital to analog converter. In a second embodiment the DC output control circuit is based on a charge pump approach. The charge pump approach can provide superior performance over the microprocessor approach by minimizing the output ripple voltage caused by the incremental adjustment of the trim pin.

Advantageously, the present invention enables a system to achieve a desired voltage at the load within a narrow voltage tolerance range. A non-volatile memory in the active DC output control circuit stores multiple values of desired output voltages including nominal and test values for the margin test. The charge pump approach is the preferred embodiment of the present invention.

This summary does not purport to define the invention. The invention is defined by the claims.

DETAILED DESCRIPTION OF PREFERRED EMBODIMENTS

Figure 1:
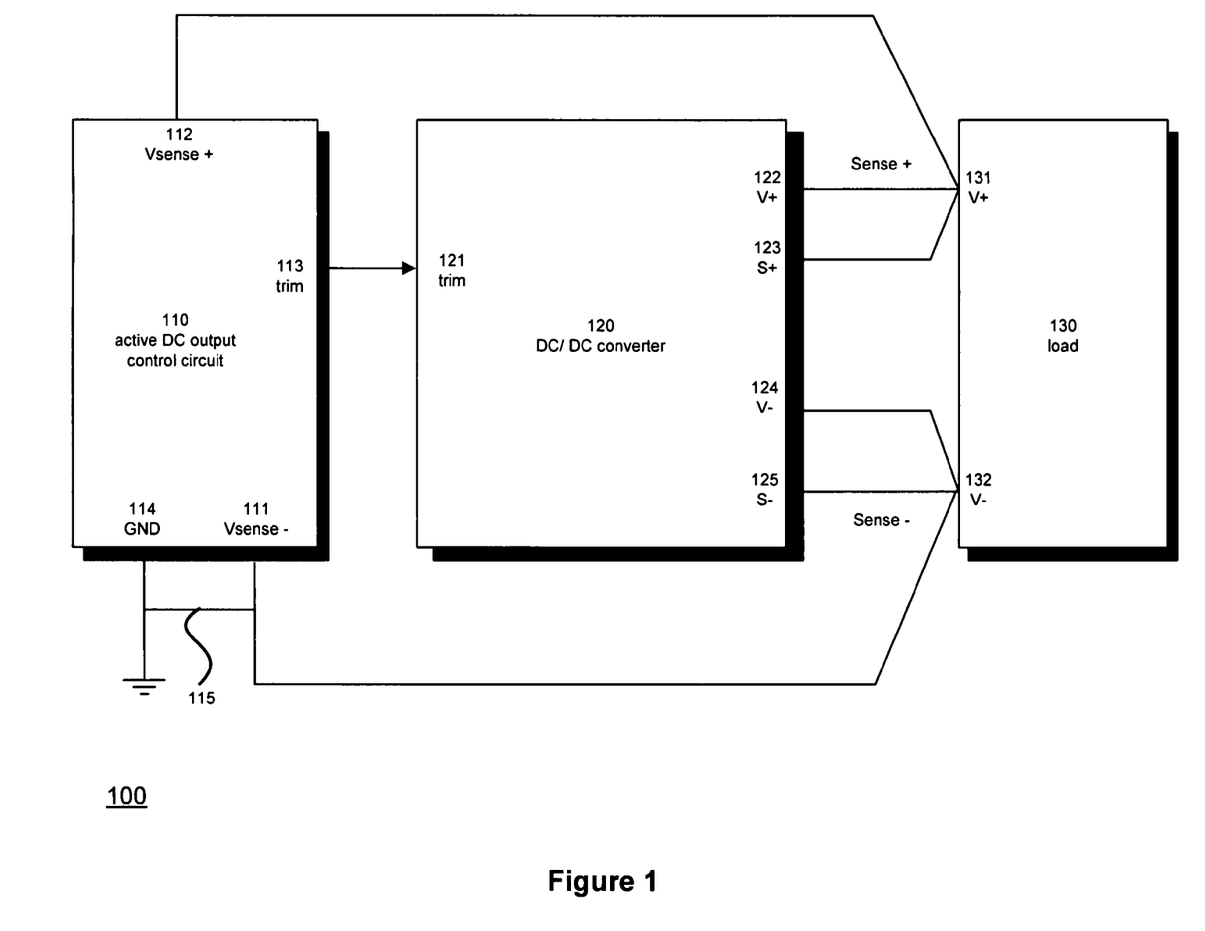
FIG. 1 is an architectural diagram illustrating a control loop system 100 that employs an active DC output control circuit 110 in accordance with the present invention.

FIG. 1 is an architectural diagram illustrating a control loop system 100. The control loop system 100 comprises an active DC output control circuit 110, which is connected to a DC/DC converter 120, which in turn is connected to a load 130. A control pin 113 from the active DC output control circuit 110 is connected to an input trim pin 121 of the DC/DC converter 120. At a V+ input 131 of the load 130, the V+ input 131 is commonly connected to a Vsense+ 112 of the active DC output control circuit 110, a V+ 122 of the DC/DC converter 120, and a S+ 123 of the DC/DC converter 120. At a V− input 132 of the load 130, the V− input 132 is commonly connected to a V sense− 111 of the active DC output control circuit 110, a V− 124 of the DC/DC converter 120, and a S− 125 of the DC/DC converter 120. An objective of the control loop system 100 is to precisely regulate the DC/DC converter output voltage Vout, which equals the voltage difference between V+ 131 and V− 132 at the load 130. More information about the control loop system with multiple loads can be found in U.S. patent application Ser. No. 10/294,842 titled "Active DC Output Control and Method for DC/DC Converters," which is incorporated herein by reference.

Figure 2:
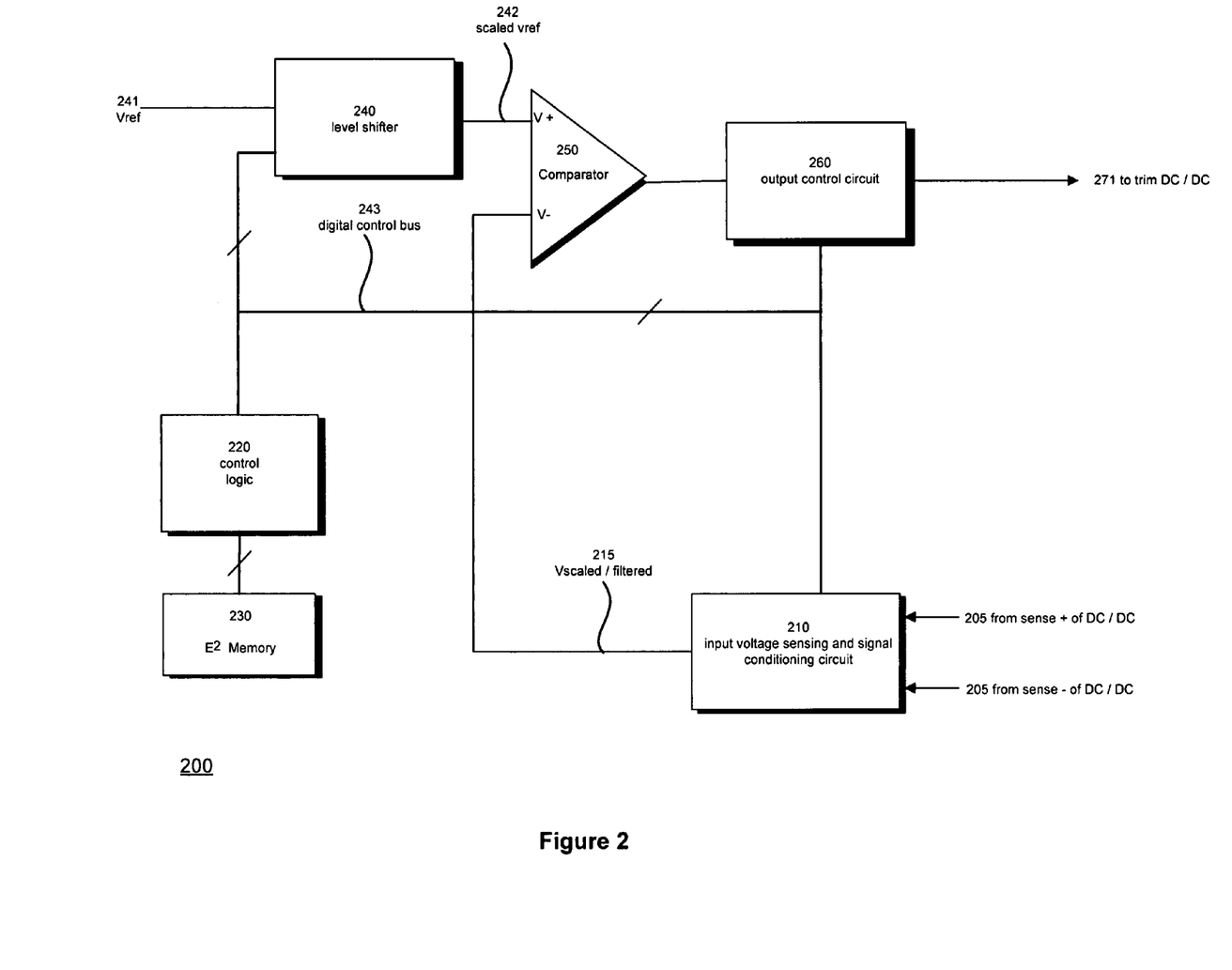
FIG. 2 is a block diagram illustrating the active DC output control circuit 110 that employs an input voltage sensing and signal conditioning circuit 210 and an output control circuit 260 in accordance with the present invention.

FIG. 2 is a block diagram illustrating the active DC output control circuit 110 that employs an input voltage sensing and signal conditioning circuit 210 and an output control circuit 260. More information about the input voltage sensing and signal conditioning circuit 210 can be found in U.S. patent application Ser. No. 10/294,842 titled "Active DC Output Control and Method for DC/DC Converters," which is incorporated herein by reference. A scaling ratio Xshift of a level shifter 240, a scaling ratio Xscale of the input voltage sensing and signal conditioning circuit 210 and circuit configuration of the output control circuit 260 can be configured by a control logic 220 via a digital control bus 243. For a given level shifter input Vref 241, Xshift and Xscale can be selected according to the equation Xshift*Vref=Xscale*Vout for achieving a desired DC/DC converter output voltage Vout.

Figure 3A:
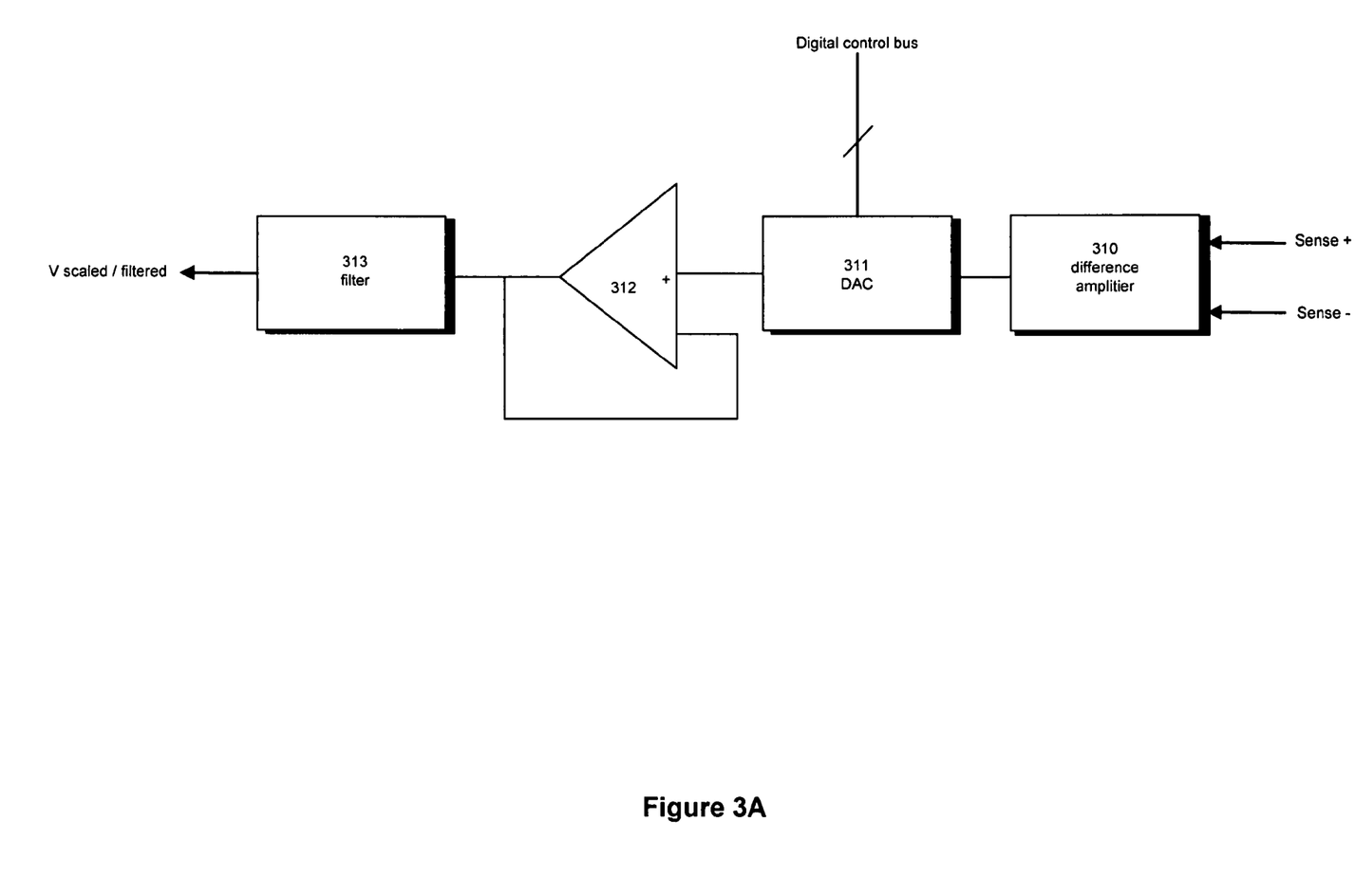
FIG. 3A is a schematic diagram illustrating the input voltage sensing and signal conditioning circuit 210 in accordance with the present invention.
Figure 3B:
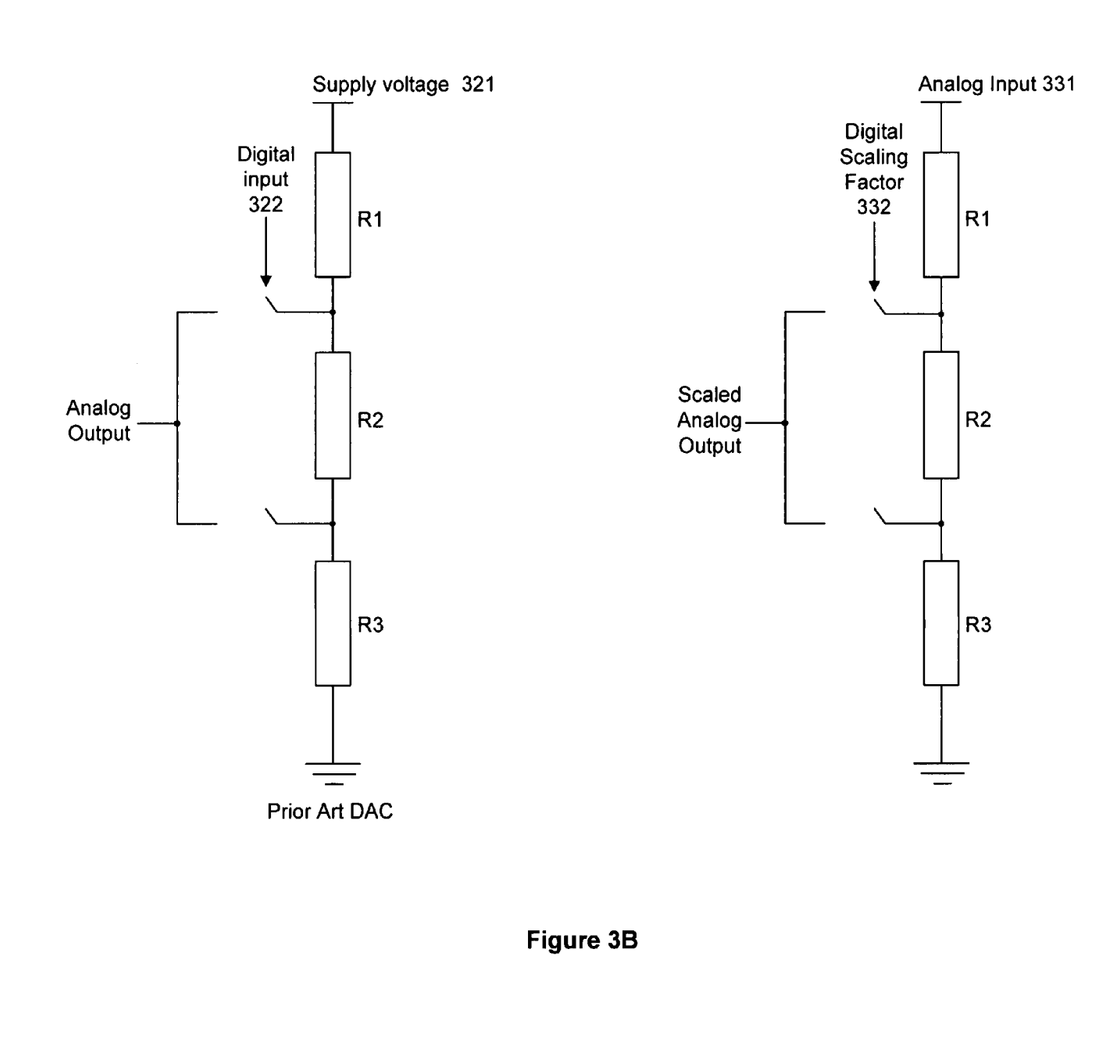
FIG. 3B illustrates a digital to analog converter being used in a novel application to scale an analog input signal.

FIG. 3A is a schematic diagram of the input voltage sensing and signal conditioning circuit 210. The input voltage sensing and signal conditioning circuit 210 employs a digital to analog converter circuit DAC 311. FIG. 3B illustrates how DAC 311 is being used in a novel application to scale an analog input signal 331 by reconfiguring the digital input 322 to represent the digital scaling factor 332 and by connecting the analog input signal 331 to the supply voltage terminal 321 of the digital to analog converter circuit. In this configuration the digital to analog converter is configured to be a digitally controlled voltage divider that scales the analog input signal.

FIG. 1, 2, 3 together illustrate the following operations. The input voltage sensing and signal conditioning circuit 210 receives a sense+ signal 205 and a sense− signal 206 into a difference amplifier 310 and a DAC 311 which scales the analog voltage level Vout to Vout*Xscale in response to the control logic 220 based on a scaling ratio control data Xscale stored in NV Memory 230. The scaled analog voltage level is further conditioned and filtered through the unity gain amplifier 312 and the filter 313. The input voltage sensing and signal conditioning circuit 210 generates a scaled/filtered ($V_{scaled/filtered}$) signal 215 to a comparator 250. A level shifter 240 scales a reference signal 241 Vref to Vref*Xshift in response to the control logic 220 based on a scaling ratio control data Xshift stored in NV Memory 230 and generates a scaled reference signal 242. The comparator 250 compares the scaled/filtered ($V_{scaled/filtered}$) signal 215 with the scaled reference signal 242. For single ended operation, the difference amplifier 310 can be omitted and the sense− signal can be connected to a ground. In FIG. 1 the connection 115 between Vsense− 111 and GND 114 is only present for this signal ended operation.

Figure 4:
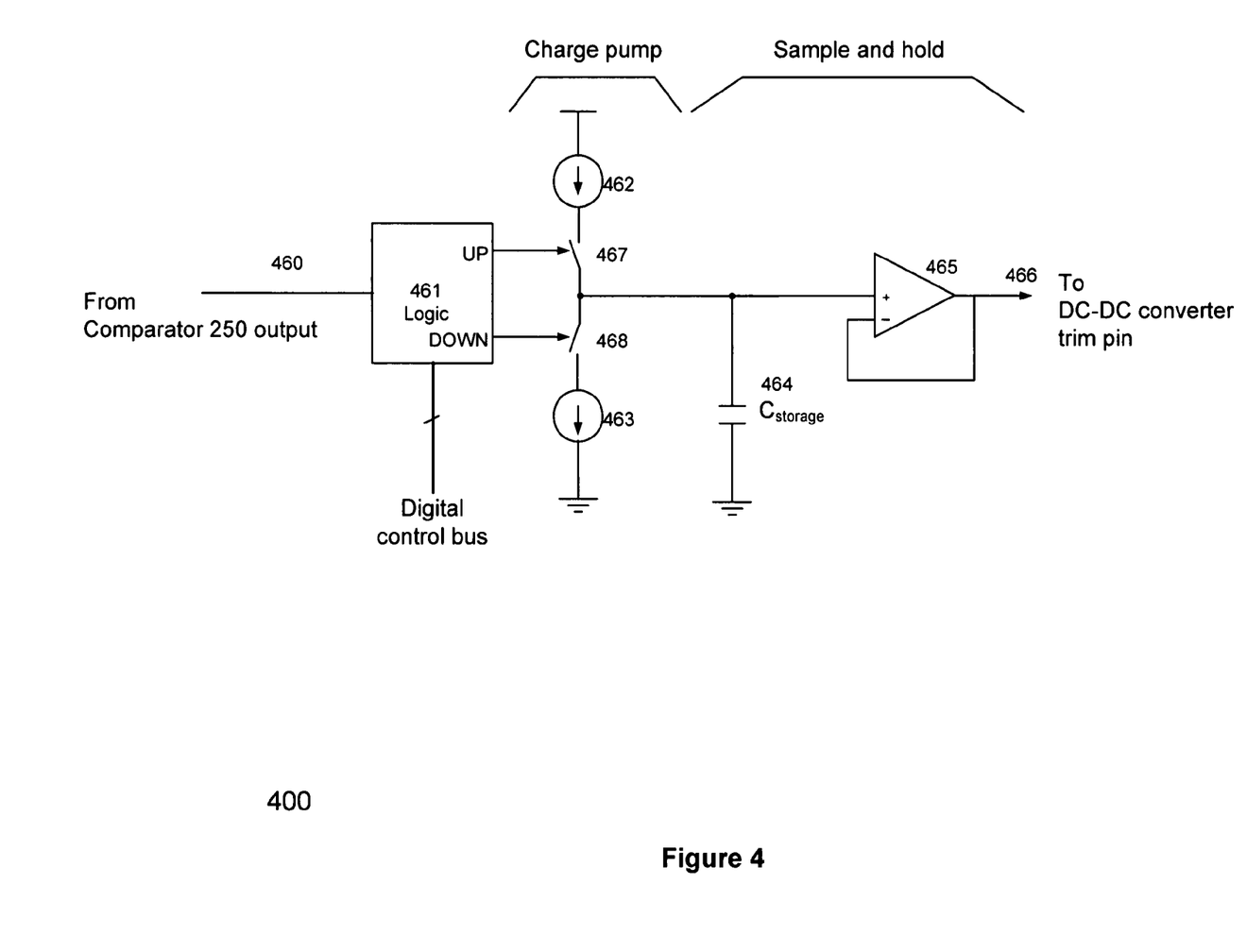
FIG. 4 is a schematic diagram illustrating the output control circuit 260 in accordance with the present invention.

FIG. 4 is a schematic diagram illustrating the output control circuit 260. The switch 467 and 468 can be implemented as MOS transistor, bipolar transistor, JFET transistor, or any equivalent devices. The unity gain amplifier 465 drives the trim pin 121 of the DC/DC converter 120 based on the voltage of a storage capacitor Cstorage 464 during normal operation. The input and output of the unity gain amplifier 465 is flipped around during initial set up stage upon power on to initialize the storage capacitor Cstorage voltage based on the initial voltage of the trim pin 121 of the DC/DC converter 120. This flip around of the input and output can be accomplished by inserting switches, which are configured by the control logic 220 via the digital control bus 243, at the input and output of the unity gain amplifier 465 and is not illustrated in FIG. 4. During normal operation, if the DC/DC converter 120 has a positive polarity and the scaled reference signal 242 is greater than the Vscaled/filtered signal 215, the active DC output control circuit 110 adjusts the voltage on the trim pin 113 slightly upward to increase the output voltage. This is accomplished by the logic 461 turning on switch 467 for connecting current source 462 to charge the capacitor Cstorage 464 for a pre-determined time period Tpulse. If the DC/DC converter 120 has a positive polarity and the scaled reference signal 242 is less than the Vscaled/filtered signal 215, the active DC output control circuit 110 adjusts the voltage on the trim pin 113 slightly downward to decrease the output voltage. This is accomplished by the logic 461 turning on switch 468 for connecting current source 463 to discharge the capacitor Cstorage 464 for a pre-determined time period Tpulse. If the DC/DC converter 120 has a negative polarity and the scaled reference signal 242 is greater than the Vscaled/filtered signal 215, the active DC output control circuit 110 adjusts the voltage on the trim pin 113 slightly downward to increase the output voltage. This is accomplished by the logic 461 turning on switch 468 for connecting current source 463 to discharge the capacitor Cstorage 464 for a pre-determined time period Tpulse. If the DC/DC converter 120 has a negative polarity and the scaled reference signal 242 is less than the Vscaled/filtered signal 215, the active DC output control circuit 110 adjusts the voltage on the trim pin 113 slightly upward to decrease the output voltage. This is accomplished by the logic 461 turning on switch 467 for connecting current source 462 to charge the capacitor Cstorage 464 for a pre-determined time period Tpulse. The value of charge/discharge time period Tpulse, current source I and capacitor Cstorage are chosen based on the DC/DC converter trim input gain and the allowable ripple voltage Vripple on the DC/DC converter output voltage induced by the charge/discharge events in the output control circuit 260. The DC/DC converter trim input gain A is defined as the ratio of DC/DC output voltage change, induced by the trim input, over the trim input voltage change. The value A is an inherent characteristic of a DC/DC converter. In the present invention Vripple=A*I*Tpulse/Cstorage where I represents the value of the current sources 462 and 463. It is an objective of the present invention to choose the value Tpulse, I and Cstorage so that Vripple is insignificant compared to the inherent output ripple voltage from the internal primary loop of a DC/DC converter. It is also an objective of the present invention to choose the repetitive rate of charging and discharging the capacitor Cstorage 464 to be at least 10 times less than the primary control loop bandwidth of the DC/DC converter. In an example where the DC/DC converter output voltage is 3.3 v and the trim pin nominal voltage is 1.25 v, the trim pin voltage can vary between 0 v-2.5 v to cause the DC/DC converter output voltage to vary between +/−20% range for margin test purposes. The trim pin input gain A=3.3 v*20%/1.25 v=0.528. With a choice of Cstorage=1 uF and I*Tpulse=100 nA*1.7 ms, DC/DC converter output voltage ripple=Vripple=A*I*Tpulse/Cstorage=90 uV. In comparison for a microprocessor based approach employing a 10 bit DAC and a 3.3V reference voltage with comparable trim pin input gain 0.528, the DC/DC converter output voltage ripple=Vripple=3.3V/$2^{10}$*A=1.7 mV. This example illustrates that the charge pump approach can provide a superior performance than the microprocessor approach in DC/DC converter output ripple voltage caused by the incremental adjustment of the trim pin.

In FIG. 2, a control logic 220 allows the user to interface with the active DC output control circuit 110. In addition, the control logic 220 controls the scaling ratio control data Xscale going to the DAC 311 and the scaling ratio control data Xshift going to the level shifter 240 via digital control bus 243. Furthermore, the control logic 220 controls the sequence of events as well as the flip around of the input and output of the unity gain amplifier 465 that occurs in the active DC output control circuit 110 via digital control bus 243. The control logic 220 is coupled to a NV memory 230 that stores the scaling ratio control data for the DAC 311 and level shifter 240. The level shifter 240 allows for DC/DC converter to deliver output voltage Vout lower than the reference voltage Vref 241 based on the equation Vref*Xshift=Vout*Xscale.

The output control circuit 260 generates an output signal 271 to trim the DC voltage at the load 130. The output signal 271 generated by the output control circuit 260 can be either a voltage signal or a current signal by choosing appropriate circuitry 465. The output control circuit 260 is connected to the comparator 250 for increasing or decreasing the output signal 271 to trim the DC/DC converter using the results of the comparator 250 until the equation Vref*Xshift=Vout*Xscale is satisfied.

Figure 5:
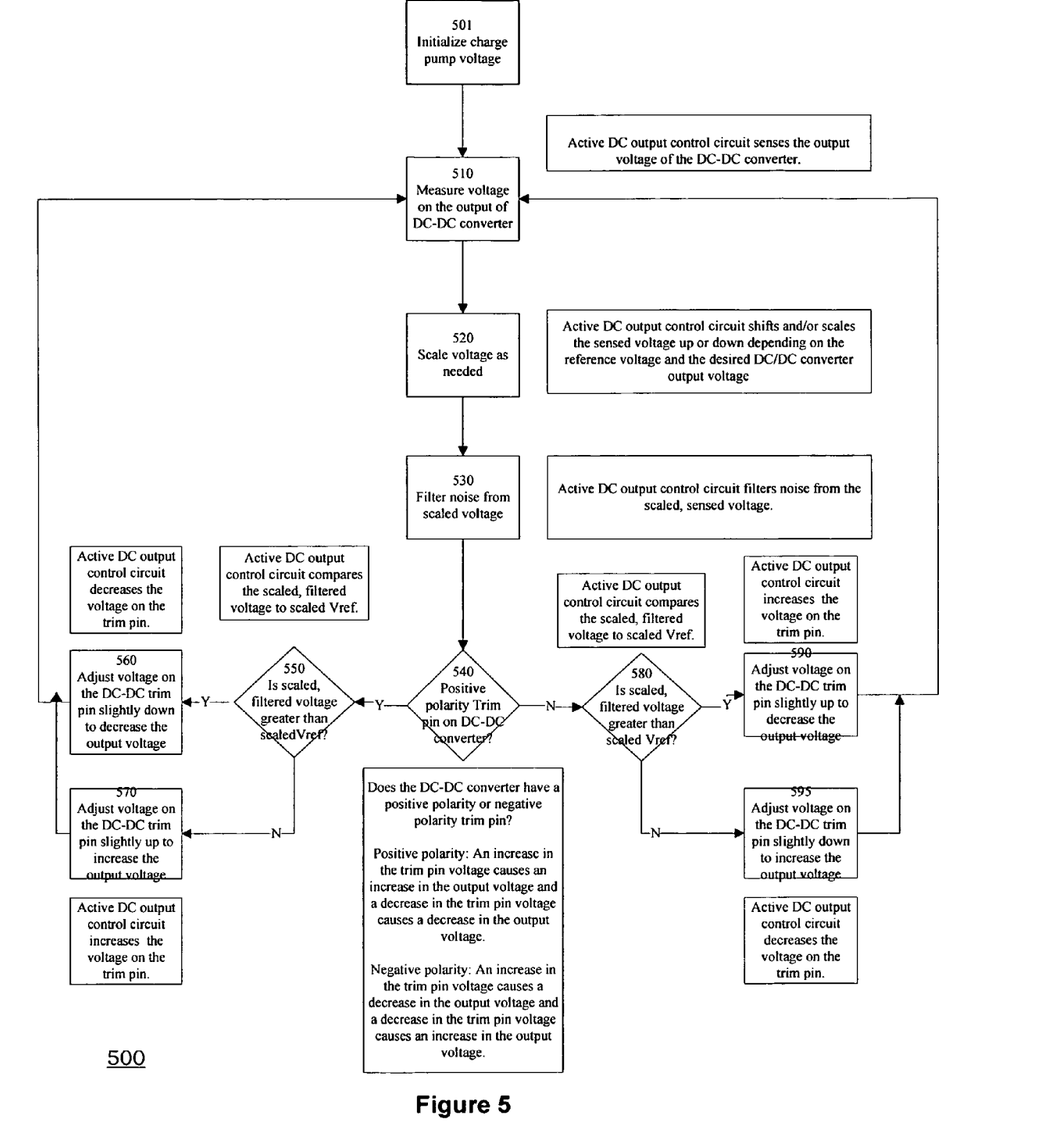
FIG. 5 is a flow diagram illustrating the process for monitoring an active DC output control loop in accordance with the present invention.

FIG. 5 is a flow diagram 500 illustrating the process for actively controlling the DC output of a DC/DC converter. The active DC output control circuit 110 senses the output voltage V+ 131 and V− 132 of the DC/DC converter 120 and measures at step 510 the output voltage V+ 131 and V− 132 of the DC/DC converter 120. At step 520, the active DC output control circuit 110 scales, by a factor Xscale, the sensed voltage in consideration of the reference voltage Vref 241 scaled, by a factor Xshift, by the level shifter 240. The factors Xscale and Xshift are chosen based on a desired DC/DC output voltage Vout and the available reference voltage Vref according to the equation Vref*Xshift=Vout*Xscale. The active DC output control circuit 110 filters at step 530 the noise from the scaled sensed voltage. At step 540, the active DC output control circuit 110 will react differently depending on whether the trim pin 121 on the DC/DC converter 120 has a positive polarity or a negative polarity. If the trim pin 121 has a positive polarity, an increase in the trim pin voltage causes an increase in the output voltage and a decrease in the trim pin voltage causes a decrease in the output voltage. If the trim pin 121 has a negative polarity, an increase in the trim pin voltage causes a decrease in the output voltage and a decrease in the trim pin voltage causes an increase in the output voltage.

In the scenario where the trim pin 121 has a positive polarity, the active DC output control circuit 110 determines at step 550 if the Vscaled/filtered signal 215 is greater than the scaled reference signal 242 by comparing the Vscaled/filtered signal 215 to the scaled reference signal 242. If the Vscaled/filtered Signal 215 is greater than the scaled reference signal 242, the active DC output control circuit 110 decreases at step 560 the voltage on the control pin 113, thereby adjusting the voltage on the DC/DC trim pin slightly downward to decrease the output voltage. If the Vscaled/filtered signal 215 is less than the scaled reference signal 242, the active DC output control circuit 110 increases at step 570 the voltage on the control pin 113, thereby adjusting the voltage on the DC/DC trim pin slightly upward to increase the output voltage.

In the scenario where the trim pin 121 has a negative polarity, the active DC output control circuit 110 determines at step 580 if the Vscaled/filtered signal 215 is greater than the scaled reference signal 242 by comparing the Vscaled/filtered signal 215 to the scaled reference signal 242. If the Vscaled/filtered signal 215 is greater than the scaled reference signal 242, the active DC output control circuit 110 increases at step 590 the voltage on the control pin 113, thereby adjusting the voltage on the DC/DC trim pin slightly upward to decrease the output voltage. If the Vscaled/filtered signal 215 is less than the scaled reference signal 242, the active DC output control circuit 110 decreases at step 595 the voltage on the control pin 113, thereby adjusting the voltage on the DC/DC trim pin slightly downward to increase the output voltage.

The above embodiments are only illustrative of the principles of this invention and are not intended to limit the invention to the particular embodiments described. For example, although the term "load" is used, one of ordinary skill in the art should recognize that other similar or equivalent terms can be used without departing from the spirit of the present invention. Moreover, it is apparent to one skilled in the art that various types of NV memories can be used, such as an $E^2$ memory, without departing from the spirit of the present invention. Accordingly, various modifications, adaptations, and combinations of various features of the described embodiments can be practiced without departing from the scope of the invention as set forth in the appended claims.

I claim:

1. A circuit comprising:
    a DC/DC converter having an output and a trim input, wherein the trim input changes a first voltage at the output of the DC/DC converter; and
    a control circuit having a sense input coupled to the output of the DC/DC converter and an output coupled to the trim input, the control circuit comprising a comparator and an output control circuit,
    wherein the comparator receives a first signal corresponding to a reference voltage and a second signal corresponding to the first voltage at the output of the DC/DC converter, the comparator comparing the first and second signals,
    and the output control circuit having an input coupled to an output of the comparator and an output coupled to the trim input of the DC/DC converter, the output control circuit comprising:
        a capacitor, the capacitor storing a voltage;
        an amplifier having an input coupled to the capacitor and an output coupled to the trim input;
        a first current source selectively coupled to the capacitor to charge the capacitor;
        a second current source selectively coupled to the capacitor to discharge the capacitor; and
        control logic having an input coupled to an output of the comparator, the control logic controlling the first and second current sources to charge and discharge the capacitor to adjust the voltage on the trim input to reduce a difference between the first signal and the second signal,
    wherein the DC/DC converter and the control circuit are configured in a control loop.

2. The circuit of claim 1 wherein the control logic charges and discharges the capacitor at a rate that is at least 10 times less than a primary control loop bandwidth of the DC/DC converter.

3. The circuit of claim 1,
    wherein the amplifier is configured to have an input coupled to the capacitor and an output coupled to the trim input during normal operation, and wherein the amplifier is configured to initialize the voltage on the capacitor based on an initial voltage on the trim input during initialization.

4. The circuit of claim 1, the control circuit further comprising:
    a first circuit to receive the first voltage at the output of the DC/DC converter, the first circuit scaling the first voltage by a first scaling ratio to produce the second signal; and
    a second circuit to receive the reference voltage, the second circuit scaling the reference voltage by a second scaling ratio to produce the first signal.

5. The circuit of claim 4 further comprising digital control logic to configure the first scaling ratio of the first circuit and the second scaling ratio of the second circuit.

6. The circuit of claim 4 further comprising a non-volatile memory coupled to the first and second circuits, the non-volatile memory storing the first and second scaling ratios.

7. The circuit of claim 4, the first circuit comprising a digitally controlled voltage divider, the digitally controlled voltage divider having a first digital input and a second input, wherein the second input coupled to the output of the DC/DC converter, the digitally controlled voltage divider scaling the voltage at the output of the DC/DC converter based on a digital input signal.

8. The circuit of claim 4, the second circuit comprising a level shifter having an input coupled to the reference voltage, wherein the level shifter is digitally configured to scale the reference voltage by the second scaling ratio.

9. The circuit of claim 1 wherein the control circuit adjusts the trim input of the DC/DC converter using a current.

10. The circuit of claim 1 wherein the control circuit adjusts the trim input of the DC/DC converter using a voltage.

11. A method comprising:
coupling a first voltage on an output of a DC/DC converter to a sense input of a control circuit, the DC/DC converter further having a trim input, wherein the trim input changes the first voltage at the output of the DC/DC converter, and the control circuit having an output coupled to the trim input;
receiving, at a comparator in the control circuit, a first signal corresponding to a reference voltage and a second signal corresponding to the first voltage at the output of the DC/DC converter, wherein an output of the comparator is coupled to an input of an output control circuit, and wherein an output of the output control circuit is coupled to the trim input of the DC/DC converter,
selectively coupling a first current source in the output control circuit to a capacitor to charge the capacitor and selectively coupling a second current source in the output control circuit to the capacitor to discharge the capacitor using control logic, the control logic having an input coupled to an output of the comparator;
storing a voltage on a capacitor;
coupling the voltage on the capacitor through an amplifier, wherein the amplifier has an input coupled to the capacitor and an output coupled to the trim input;
wherein the control logic controls the first and second current sources to charge and discharge the capacitor to adjust the voltage on the trim input to reduce a difference between the first signal and the second signal, and
wherein the DC/DC converter and the control circuit are configured in a control loop.

12. The method of claim 11 wherein the control logic charges and discharges the capacitor at a rate that is at least 10 times less than a primary control loop bandwidth of the DC/DC converter.

13. The method of claim 11 wherein the amplifier is configured to have an input coupled to the capacitor and an output coupled to the trim input during normal operation, and wherein the amplifier is configured to initialize the voltage on the capacitor based on an initial voltage on the trim input during initialization.

14. The method of claim 11 further comprising:
receiving, in a first circuit, the first voltage at the output of the DC/DC converter, the first circuit scaling the first voltage by a first scaling ratio to produce the second signal; and
receiving, in a second circuit, the reference voltage, the second circuit scaling the reference voltage by a second scaling ratio to produce the first signal.

15. The method of claim 14 further comprising configuring the first scaling ratio of the first circuit and the second scaling ratio of the second circuit.

16. The method of claim 14 further comprising storing the first and second scaling ratios in a non-volatile memory coupled to the first and second circuits.

17. The method of claim 14 wherein the first circuit comprises a digitally controlled voltage divider to scale the first voltage at the output of the DC/DC converter.

18. The method of claim 14 further comprising level shifting the reference voltage, wherein the level shifting is digitally configured to scale the reference voltage by the second scaling ratio.

19. The method of claim 11 wherein the control circuit adjusts the trim input of the DC/DC converter using a current.

20. The method of claim 11 wherein the control circuit adjusts the trim input of the DC/DC converter using a voltage.

* * * * *